United States Patent [19]

Medina

[11] Patent Number: 5,274,474
[45] Date of Patent: Dec. 28, 1993

[54] INTEGRATED TELEFACSIMILE AND CHARACTER COMMUNICATION SYSTEM WITH STANDARD AND HIGH SPEED MODES

[75] Inventor: Mitchell Medina, Essex Fells, N.J.

[73] Assignee: Randolph-Rand Corporation, New York, N.Y.

[21] Appl. No.: 644,602

[22] Filed: Jan. 23, 1991

[51] Int. Cl.⁵ .............................................. H04N 1/40
[52] U.S. Cl. .................. 358/462; 358/468; 358/435; 379/100
[58] Field of Search .............. 358/468, 435, 436, 438, 358/462, 439; 379/100; 382/41

[56] References Cited

U.S. PATENT DOCUMENTS

| | | | |
|---|---|---|---|
| 4,000,371 | 12/1976 | Ogawa | 358/435 |
| 4,034,343 | 7/1977 | Wilmer | 382/45 |
| 4,410,916 | 10/1983 | Pratt et al. | 358/435 |
| 4,566,127 | 1/1986 | Sekiya et al. | 382/56 |
| 4,630,126 | 12/1986 | Kaku et al. | 358/438 |
| 4,672,459 | 6/1987 | Kudo | 358/462 |
| 4,736,249 | 4/1988 | Iizuka et al. | 358/435 |
| 4,759,053 | 7/1988 | Satomi et al. | 179/2 |
| 4,899,225 | 2/1990 | Sasuga et al. | 358/443 |
| 4,922,349 | 5/1990 | Abe et al. | 358/443 |
| 4,922,545 | 5/1990 | Endoh et al. | 382/56 |
| 5,034,990 | 7/1991 | Klees | 382/22 |
| 5,041,915 | 8/1991 | Hirota et al. | 358/438 |
| 5,041,917 | 8/1991 | Koshiishi | 358/434 |
| 5,050,004 | 9/1991 | Morton, Jr. | 358/434 |
| 5,095,445 | 3/1992 | Sekiguchi | 379/100 |

FOREIGN PATENT DOCUMENTS

| | | | |
|---|---|---|---|
| 0054170 | 5/1981 | Japan | 358/462 |
| 57-57078 | 4/1982 | Japan . | |
| 0063953 | 4/1982 | Japan | 358/468 |
| 58-1374 | 1/1983 | Japan . | |
| 0178766 | 9/1985 | Japan | 358/468 |
| 60-246153 | 12/1985 | Japan . | |

Primary Examiner—Edward L. Coles, Sr.
Assistant Examiner—Jill Jackson
Attorney, Agent, or Firm—Foley & Lardner

[57] ABSTRACT

A telefacsimile machine selectively operates in standard and high speed modes depending on the compatibility of equipment communicating with the telefacsimile machine at a particular time. The standard mode communication employs bit mapped pixels for both text and graphics The high speed mode distinguishes text from graphics. Scanned text characters to be transmitted in the high speed mode are compared to characters in a library. When a match is found only a code, e.g. ASCII, and the location of the character is transmitted. Graphics and unrecognizable characters are transmitted as bit mapped pixels. When a document is received in the high speed mode, the received code identifies the text character and bit-mapped pixels to be printed or otherwise recorded in a storage medium. Any desired printing resolution can then be selected for text characters.

31 Claims, 11 Drawing Sheets

PRIOR ART
FIG. 2       SCANNER INTERFACE

SCANNER INTERFACE

INTEGRATED TELEFACSIMILE AND CHARACTER COMMUNICATION SYSTEM WITH STANDARD AND HIGH SPEED MODES

BACKGROUND OF THE INVENTION

1. Field of the Invention

This invention relates generally to telefacsimile machines and coding methods. More particularly, the invention relates to a telefacsimile machine having the ability to distinguish recognizable characters from unknown graphics, and to transmit codes for the recognizable characters with less data than that required by bit maps employed in known devices.

2. Related Art

Known telefacsimile or fax machines scan a document to produce pixel data. This pixel data is then compressed and sent over communications media such as telephone lines to a receiving fax machine. A problem with such telefacsimile machines is the lack of data compression for characters and the lack of efficient coding for character data.

U.S. Pat. No. 4,410,916 issued to Pratt discloses a dual mode telefacsimile compression technique, wherein spatially isolated black and white pixel patterns expected to recur in a document are extracted and coded by a matching process. A trial block area around a block pixel is examined to isolate symbols. Isolated symbols are labeled and a set of measured features is used to build a library. Each symbol subsequently found in trial blocks of the scan is compared to the features of the blocks to eliminate unworthy symbols from a template matching process If the matching error falls below a threshold, the identification of the matching library number is stored for later coding. If no symbol is found within a trial block, the block is encoded as residue using a modified relative address code and processed separately. The symbols' library identification codes and residue codes and the codes of unsuccessfully compared symbols are transmitted to receivers. The specialized coding in Pratt is quite slow due to the need to perform extensive template matching for each character. Pratt does not distinguish text from graphics, and fails to provide flexible operation in other modes, such as transmission of bit maps, so that communication is only possible among similarly equipped units.

U.S. Pat. No. 4,566,127 to Sekiya discloses a telefacsimile having an optical character reader and a central processing unit which provide coding character information and a telefacsimile mode. However, Sekiya is limited to operation with documents of a predetermined format in which character groups having predetermined attributes are disposed in a first location of the document and images having predetermined attributes are disposed in a predetermined second location U.S. Pat. No. 4,922,545 to Endo discloses a telefacsimile image coding method in which an input image pattern which occurs once is sequentially scanned and conventionally encoded. Patterns appearing twice or more, according to a matching pattern, are encoded by position coordinates and a library identification code is added at the time the pattern is registered in a library. This system is primarily a handwriting recognition system, and there is no provision for flexible operation with units not similarly equipped.

SUMMARY OF THE INVENTION

An objective of this invention is to provide a telefacsimile system which transmits documents more quickly than previous systems and which provides a higher quality printout than previous systems.

Another object of the invention is to provide a telefacsimile system which permits transmission of documents in either a high speed mode or a standard mode.

A still further object of the invention is the transmission of documents in either a high speed mode or a standard mode directly or indirectly.

A still further object of the invention is to provide a telefacsimile system which, while providing the above advantages when interfacing with other suitably equipped devices, is still compatible with the millions of conventional fax machines currently in use.

A telefacsimile machine, according to this invention, has the capability of recognizing character areas on a document and graphics areas on a document. Character areas are then analyzed by an optical character recognition means to produce character codes for recognizable ASCII or the like. Both unrecognizable characters and areas of the document which are analyzed as graphics areas are coded according to standard telefacsimile methods. The document is then transmitted as a combination of character codes, such as ASCII codes, and standard telefacsimile codes. This results in a higher compression ratios for documents containing a number of recognizable characters and therefore allows reducing the transmission time of a document.

A telefacsimile machine according to the invention may operate in either a standard telefacsimile mode or in the described high speed mode. A transmitting telefacsimile machine would typically query the receiving machine to recognize whether the receiving telefacsimile machine can process the high speed mode containing character and telefacsimile data or whether the receiving machine can only process standard telefacsimile data. The transmitting machine may automatically switch modes between the described high speed mode or the standard telefacsimile mode according to whether the receiving machine can process the high speed mode. Therefore, a telefacsimile machine according to this invention is compatible with existing telefacsimile machines.

In the high speed mode, since character codes, in ASCII or other defined character sets, are sent and then received by the receiving telefacsimile machine, characters may be printed as fully formed characters rather than as low resolution pixel data. Therefore, documents sent over this improved telefacsimile system will be more legible in the character areas than documents sent by conventional telefacsimile machines.

BRIEF DESCRIPTION OF THE DRAWINGS

FIG. 7a illustrates the integration of optional features in FIG. 4a with an alternative method of document transmission.

DETAILED DESCRIPTION OF THE PREFERRED EMBODIMENTS

Figure 1:
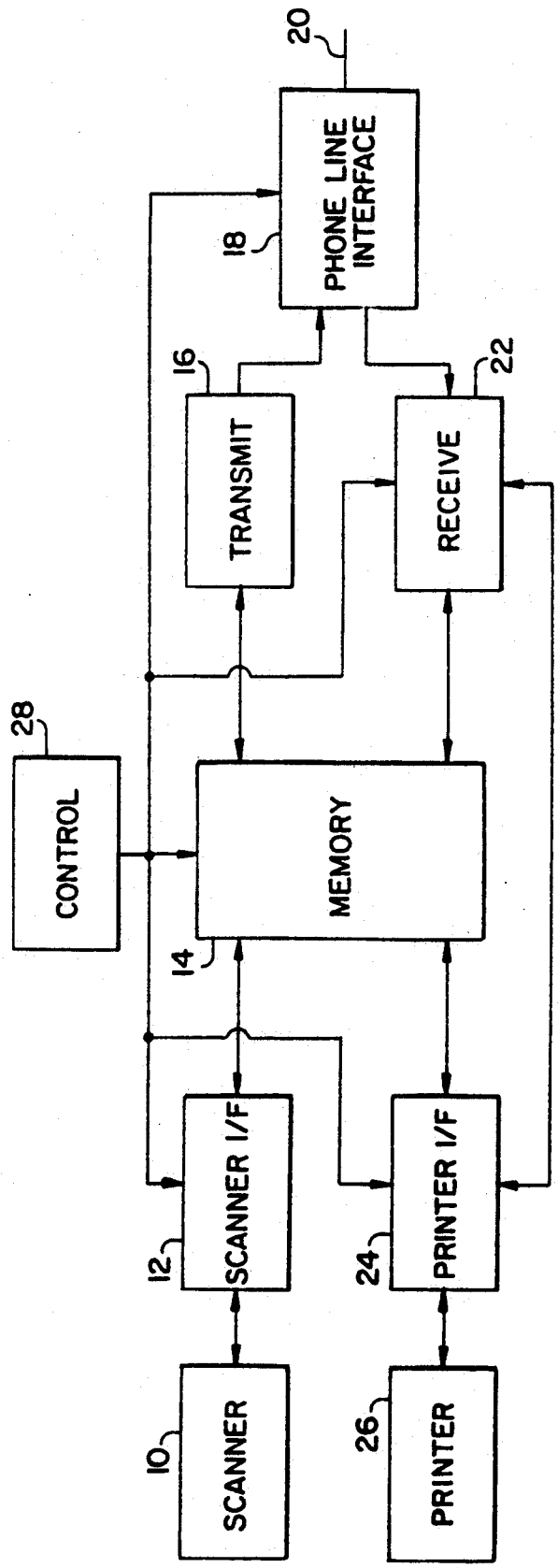
FIG. 1 is a block diagram of a telefacsimile coding transmission and reception system.

FIG. 1 is a block diagram of a telefacsimile coding transmission and reception system. A scanner 10 converts a document into bit-mapped pixels and sends them through the scanner interface 12 to the memory 14 or directly to the transmit section 16. The scanner interface 12 (otherwise referred to as a scanner control and data interface) controls the scanner 10 and processes the pixel data which is sent from the scanner 10 to the memory 14 or sent directly to the transmit section 16. After the pixel data has been processed by the scanner interface 12, the transmit section 16 sends this data through a phone line interface 18 and over a phone line 20 to a receiving fax machine.

In the reception mode data comes in over the phone line 20 through a phone line interface 18 and is placed in memory 14 by the receiving block 22, or else is sent directly to the printer interface 24. Printer interface 24 reads this received data from memory 14, or directly from the receiving block 22 processes this data, and sends it to a printer 26 to be printed as a received document. A controller 28 containing, for example, a programmed microprocessor, sequences the operation of the telefacsimile machine.

Figure 2:
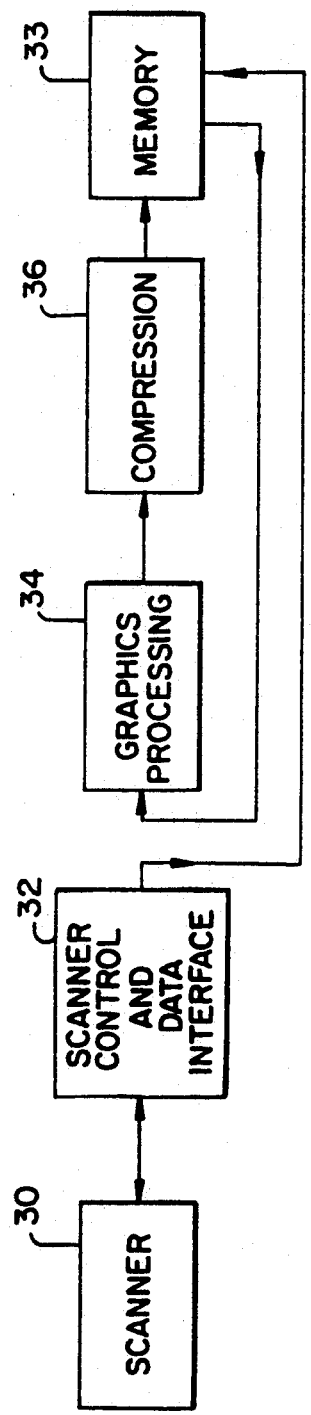
FIG. 2 is a typical conventional scanner interface.

A conventional telefax scanner and telefax scanner interface is shown in FIG. 2. Scanner 30 converts the document into bit-mapped pixels which are fed through scanner control and data interface 32 to memory 33. This pixel data, coded in standard telefacsimile format by graphics processor 34, is compressed using standard telefacsimile methods by compression block 36 and placed in memory 33 in preparation for transmission.

Figure 3:
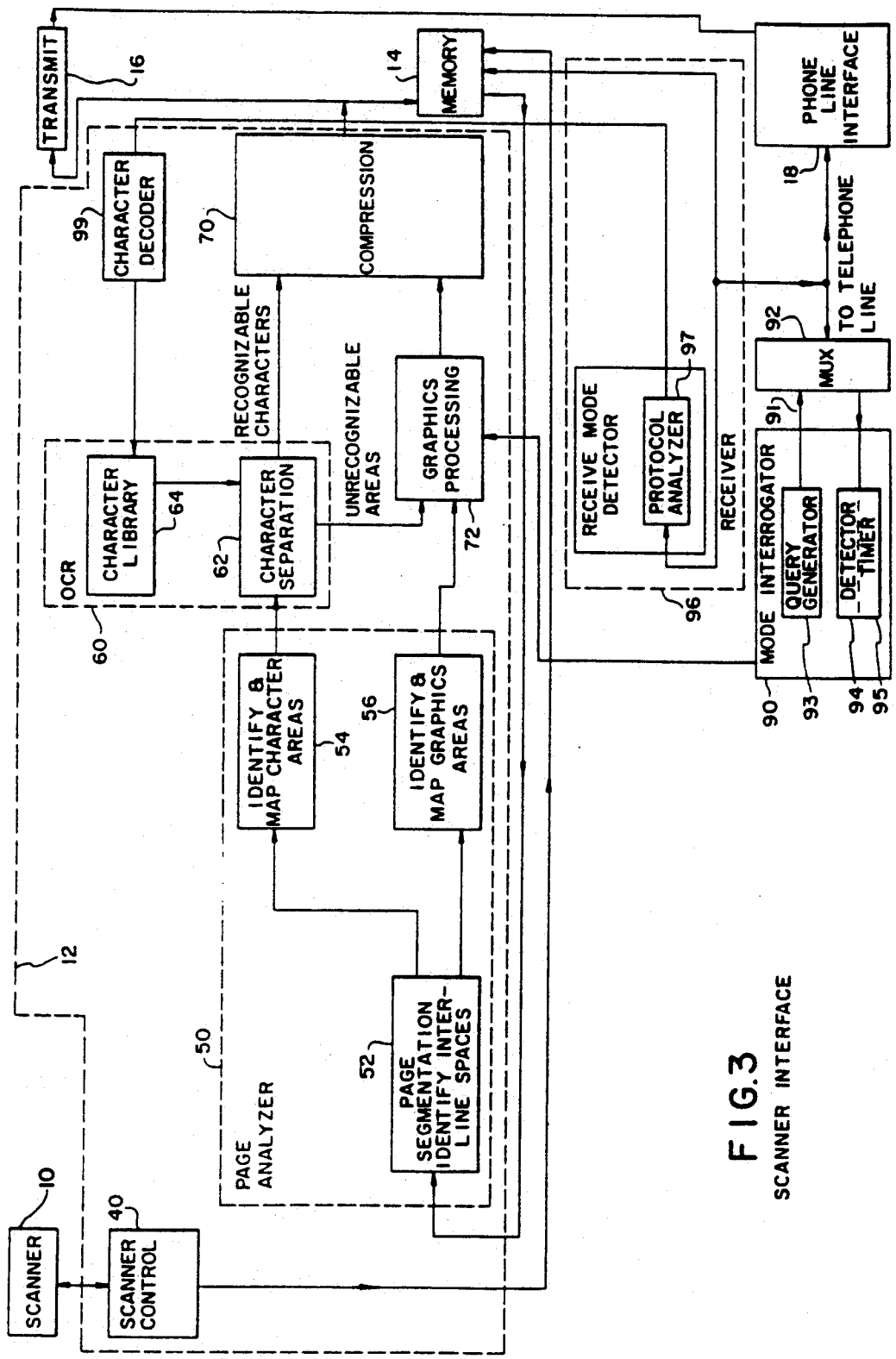
FIG. 3 is a scanner interface according to the invention.

FIG. 3 is a block diagram of a telefax scanner interface according to the present invention. The telefacsimile operates in either a standard or a high speed mode, depending on the capability of the receiving fax machine. A mode interrogator 90 has a mode query signal generator 93 which transmits a mode query signal along line 91 to the receiving or destination fax machine, for example through multiplexer 92, and analyzes the response. If detector 94 determines that the destination fax has responded with a predetermined signal, the high speed mode is set by the transmitting fax. If the transmitting fax detects a signal other than the predetermined signal or if no response is detected within a predetermined time measured by timer 95, the transmitting fax sets the standard mode. A scanner 10 converts a document into pixel information under the control of a scanner interface 12 and places this data into memory 14. Optionally scanner interface 12 may analyze the document separating it into character areas and graphics areas, code this information, compress this information and place it back into memory 14. Alternatively, the information could be provided directly to transmit section 16 without intermediate storage in memory 14.

One portion of the scanner interface 12 is dedicated solely to scanner control as indicated in block 40. Optionally, a page analyzer 50 may analyze a page of a document or, alternatively, a section of a page, such as ⅛ to ¼ of a page at a time and separates the document or portion of the document into character areas and graphics areas. Portions identified as character areas are sent to the optical character recognition block 60. Recognizable characters are sent as character codes in ASCII or the like to a compression block 70 to be further compressed and then sent to memory 14, or sent directly to transmit section 16 without intermediate storage in memory 14. Unrecognizable pixel patterns and, optionally, entire areas identified as graphics areas by the page analyzer 50, are sent to a graphics processing block 72 to be processed into a standard telefacsimile data format sent to the compressor 70, and then sent to memory 14, or directly to transmit section 16 without intermediate storage in memory 14.

Inside the page analyzer 50 a page segmentation processor 52 analyzes the pixels of the scanned page to identify interline spaces. Other methods of distinguishing character and non-character information may be used, as for example, segmentation of pages into sectors for analysis, comparison with predefined document templates stored in memory, within the fax machine itself or in a computer peripheral to the fax assembly, etc. Horizontal areas of low pixel density might indicate spaces between lines of text if these horizontal lines are repetitive and evenly spaced. Horizontal spaces which are not evenly spaced may indicate borders between graphics areas. Areas of low pixel density which run vertically may indicate spaces between columns of text or graphics areas. Areas of a document which are tentatively identified as containing character information by the page segmentation processor 52 are sent to block 54 so that these character areas can be further identified and mapped in preparation for optical character recognition by block 60. Areas of a document which are tentatively identified by the page segmentation processor 52 as being composed of unrecognizable character, non-character or graphics information are sent to block 56 to further map and identify these areas of the document. The information is then sent to the graphics processing block 72 to be processed as standard telefacsimile data.

Potential character data which is sent to the OCR block 60 is first analyzed by character separation block 62. Character separation block 62 separates a line into individual characters. These characters are then compared against those contained in a character library 64 which contains a set of standard ASCII characters or another or a variety of defined character sets. This is accomplished using well-known character recognition techniques which can identify a large variety of fonts accurately. Characters which are positively identified are sent to the compression block 70 for further compression. Unrecognizable characters or graphics areas are sent by the character separation block 62 to graphics processing block 72 to be coded as standard telefacsimile data. The standard telefacsimile data from 72 is also sent to block 70 for further compression and to be concatenated and/or merged with the compressed recognizable characters and placed into memory 14, or alternately, this data may be sent directly to transmit section 16.

The scanner interface 12 operates efficiently by using standard character recognition and page segmentation techniques. Repetitive matching techniques such as those described in U.S. Pat. Nos. 4,410,916 or 4,922,545 may also be used. The invention is, however, not limited to any fixed algorithm or method for character recognition as it is envisioned that improved character recognition algorithms will be developed in the future which would be equally applicable in performing the invention. Even present day techniques offer high gains in coding efficiency over standard telefacsimile techniques thus allowing a telefacsimile page to be transmitted in less time and, therefore, at less cost for telephone line usage then in a standard telefacsimile. Accurate recognition is important for correctly encoding and transmitting a document. Therefore, any characters which cannot be positively identified with a high degree of certainty by character separation block 62 are sent to block 72 to be processed as standard telefacsimile data.

Figure 4:
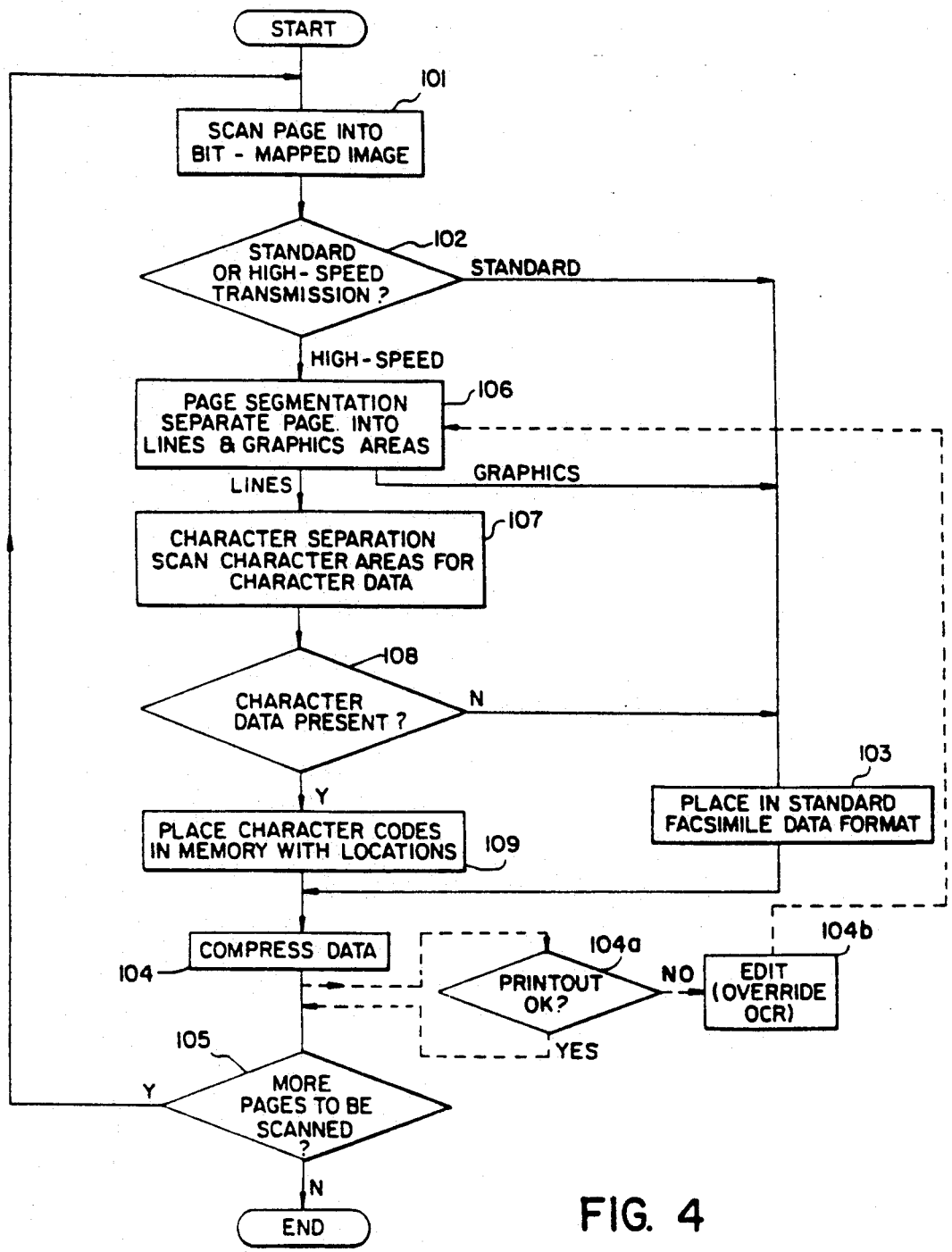
FIG. 4 is a flow chart of the operation of the scanner interface.

FIG. 4 is a flow chart of the operation of the scanner interface 12. In step 101 a page is scanned into a bit-mapped image. In step 102 the scanner interface 12 decides whether the document is to be formatted for standard telefacsimile transmission or high speed transmission. The determination is based on the capability of the receiving fax machine. As previously discussed this can be determined by transmitting a signal and looking for a predetermined response from the receiver. This can either be done in a brief querying telephone call which is disconnected prior to document processing, or else the line may be held open while processing begins immediately. Alternatively, a memory of stored protocol information relating to individual fax numbers might be consulted, either automatically, or manually by the user, who would then input such information. If the document is to be formatted for standard transmission, control passes to step 103 where the scanned pages of the document are placed in a standard telefacsimile data format. This telefacsimile data is then compressed in step 104. In step 105, the scanner interface 12 decides whether there are more pages to be scanned. If so, control is passed back to step 101.

If step 102 decides that a document is to be formatted for high-speed transmission, control is passed to step 106. In the optional page segmentation of step 106, a page is separated into potential character areas or graphics areas. Areas that are to be encoded as graphics are sent to step 103 for processing in standard telefacsimile data format. Areas which are to be processed as characters are sent to step 107 for character separation, whether page segmentation has been performed or not. In step 107 individual characters are isolated. A potential character is then processed in step 108 which decides whether an actual ASCII or other coded character is present. If the isolated character does not match a character in character library 64, it is sent to step 103 where it is placed in standard telefacsimile data format. If the isolated character does match a character in the character library 64, then in step 109 a character code for the identified character is placed in memory along with the location of that character. This character data is then compressed in step 104. Step 105 decides whether there are more pages to be scanned and, if so, control is passed back to step 101.

Figure 4A:
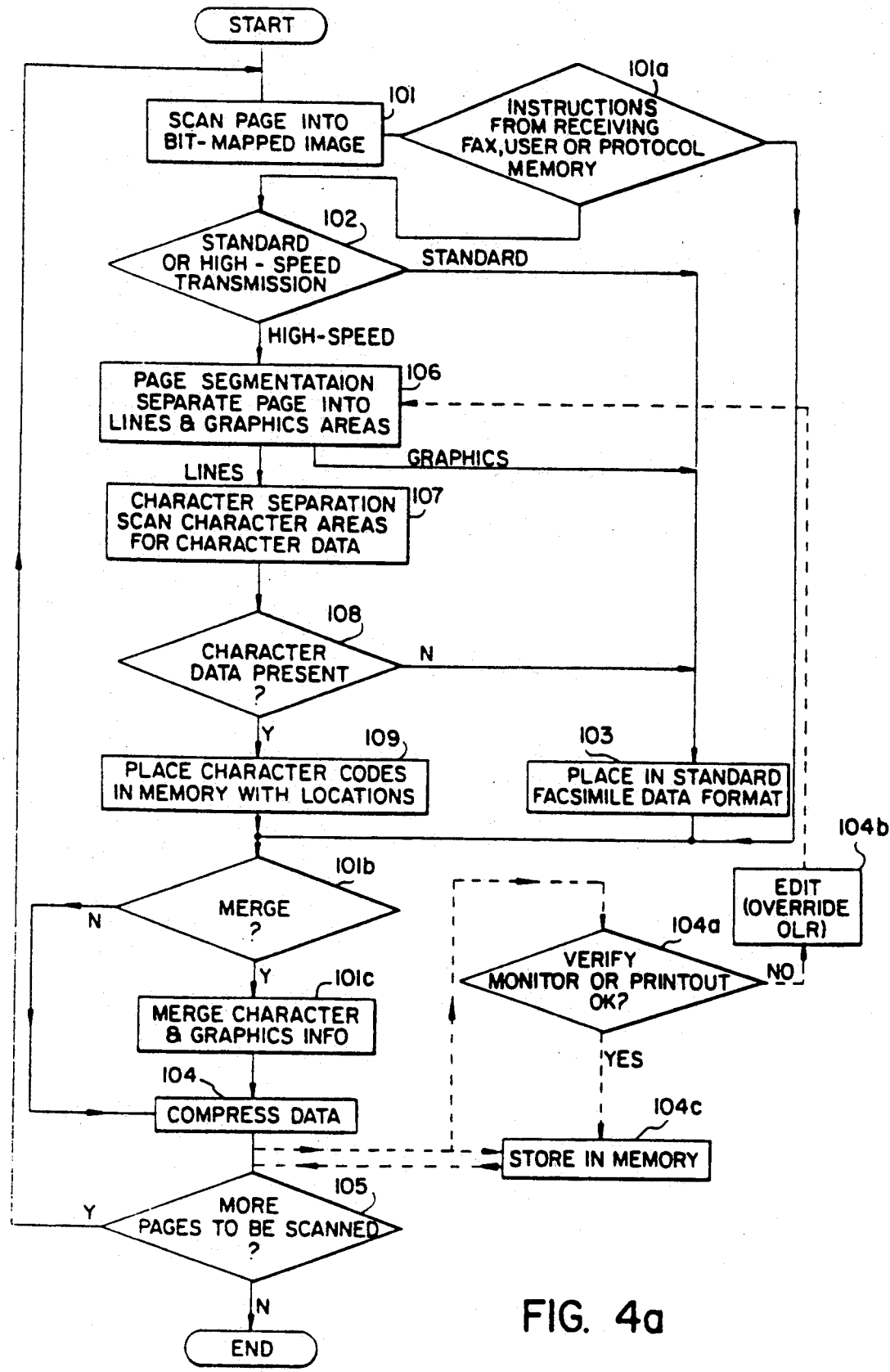
FIG. 4a illustrates optional features and an alternative embodiment of the scanner interface.

In FIG. 4a, a number of optional features and alternative embodiments are illustrated. In one alterative embodiment the decision step 102 could be delayed and a scanned document encoded and stored in a memory in both the standard and high speed formats. Upon an indication from the receiving fax of its capability, transmission could be performed in the corresponding format.

In another slightly different embodiment, the transmitting fax could maintain a preprogrammed or built up list of destination machine capabilities. For example, when a telefax number is dialed for the first time the compatible format indicated by the destination machine could be stored and subsequent transmission to that destination provided in the indicated format without inquiry. Based on such stored protocol information (or on instructions from the receiving machine or the user), as shown in step 101a, character and graphics information may be merged (steps 101b and 101c)and sent to a receiver equipped to receive such information. However, such a merge is preferrably implemented by the receiving machine during the printing process, as illustrated in FIG. 6a. As shown in step 101b, if the merge is performed at the receiving machine, step 101c is bypssed. In addition, as shown in step 104c, information correctly formatted for printing or display can also be stored in a memory.

Figure 5:
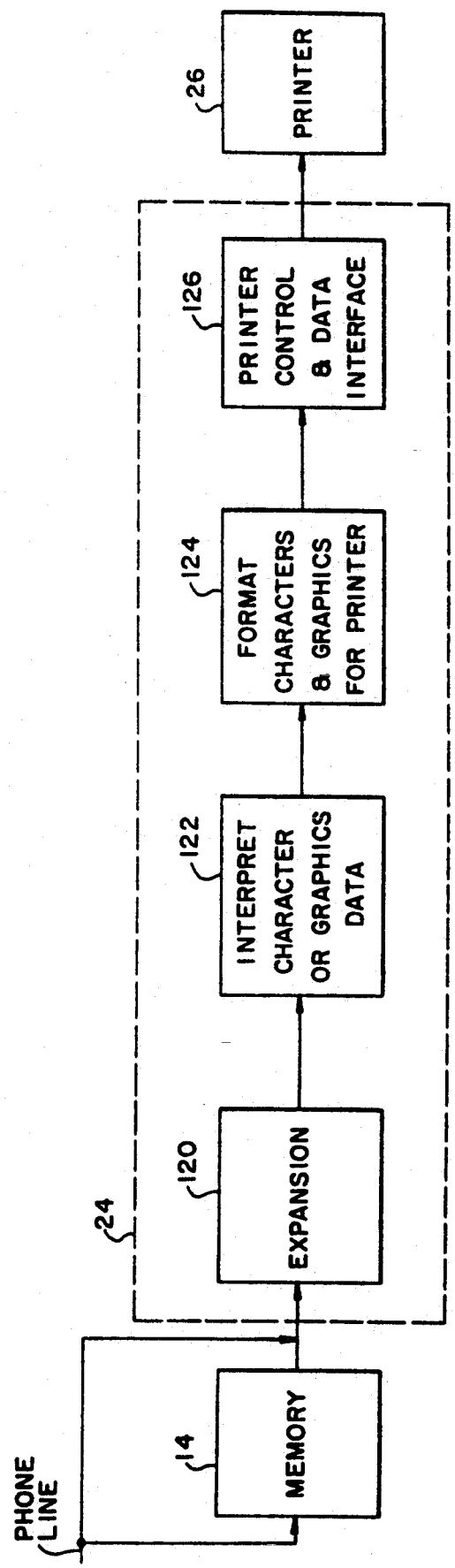
FIG. 5 is a block diagram of the printer interface.

FIG. 5 is a block diagram of the printer interface 24. When a page or a portion of a page is to be printed, the information is read from memory 14 or directly from the phone line, processed by the printer interface 24 and sent to the printer 26. In the printer interface 24, the data from the memory or phone line 14 is decompressed or expanded in block 120, interpreted as character or graphics data in block 122, formatted as character codes or graphics codes for the printer in block 124, and sent through the printer control and data interface 126 to the printer 26. By decoding character data codes, printer interface 24 does not simply reproduce a received bit map. Instead, printer interface 24 independently prints the character based on the coded information. One advantage which this printer interface 24 provides over other printer interfaces for telefacsimile machines is that character information may be printed at a higher resolution. This is because a character which is scanned at 100 or 200 dots per inch and identified as, for instance, an A, is transmitted as the character code for an A in ASCII or the like. The printer interface 24 at the receiving end recognizes this character code is the letter A. Since only the character code is needed, the printer can be set to print at a different resolution, for instance 300 dots per inch. Therefore, a document which is sent via this telefacsimile method and which is composed mainly of text could be much more legible than a document sent via conventional telefacsimile methods. In addition, lower resolution printing could be selected to speed the printing process.

Figure 6:
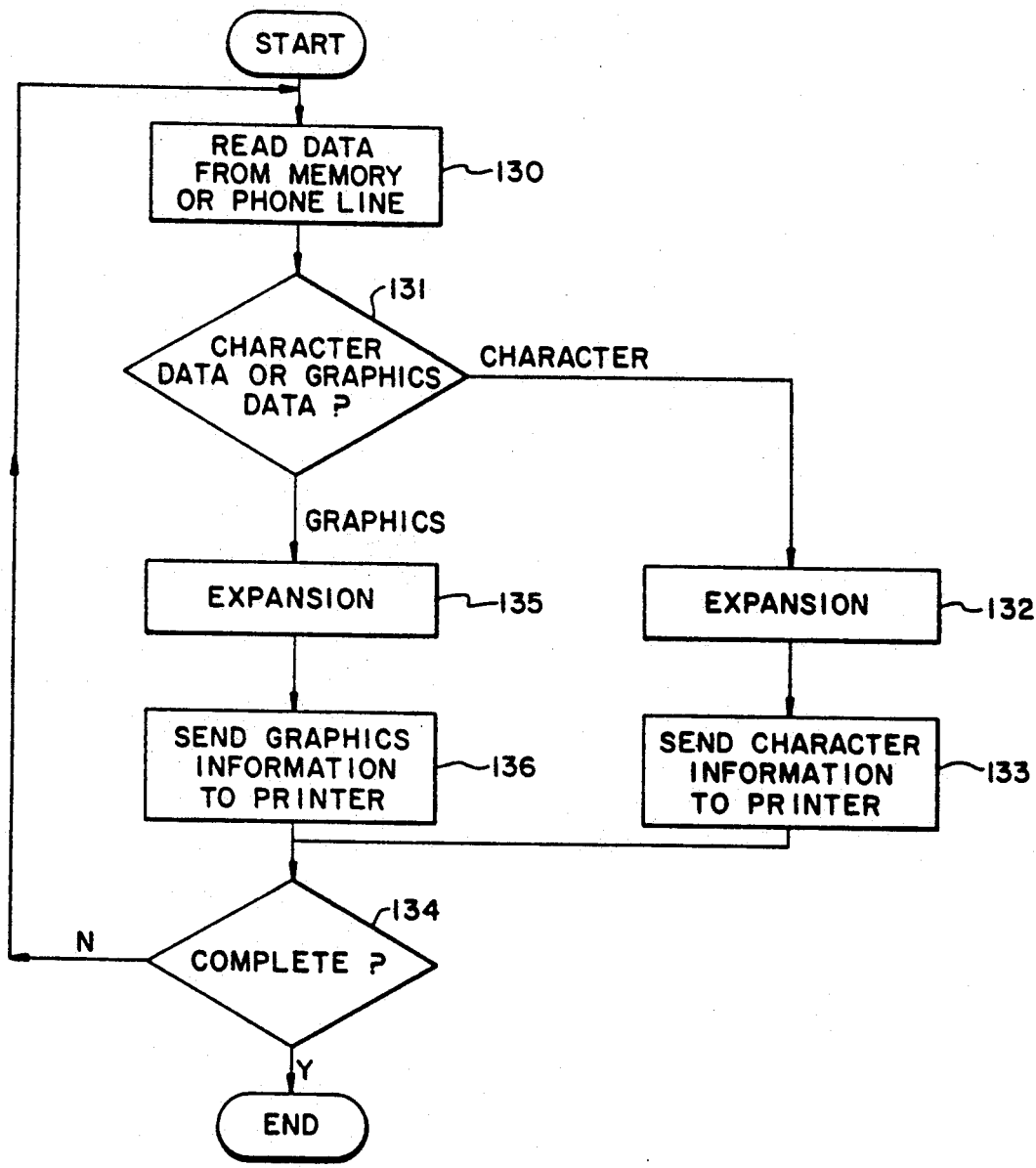
FIG. 6 is a flow chart of the operation of the printer interface.
Figure 6A:
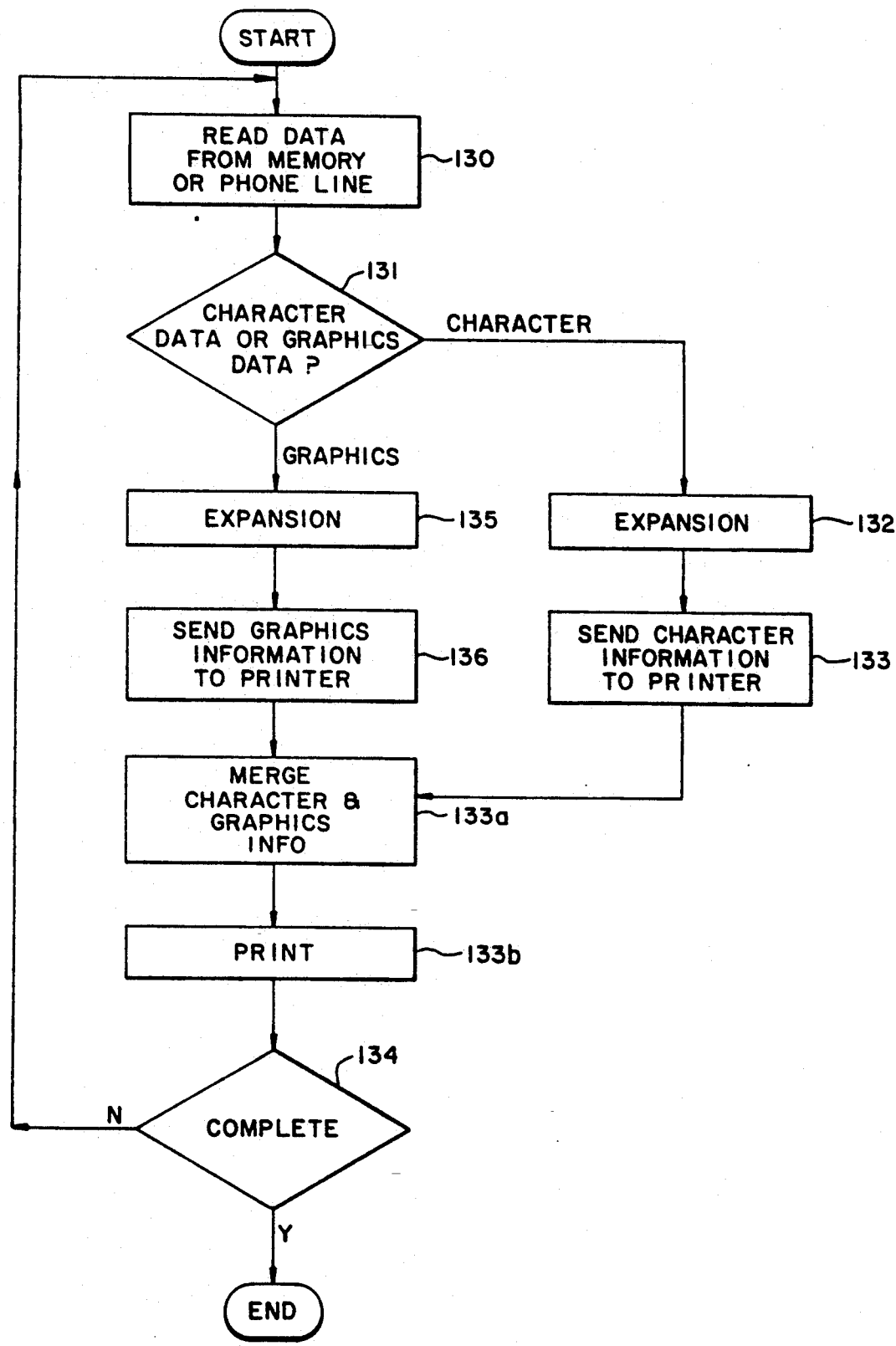
FIG. 6a is a flow chart of another mode of operation of the printer interface.

A flow chart of the operation of the printer interface is shown in FIG. 6. In step 130 the data to be printed is read from memory directly or from the phone line. Whether the information to be printed is either compressed character data or compressed graphics data is determined in step 131. If the information is compressed character data, control passes to step 132, which expands the compressed character data. In step 133 this character information is sent in the correct format to the printer. Step 134 determines whether the printing is complete. If printing is incomplete control passes back to step 130, where more data is read from memory or the phone line.

If step 131 processing determines that compressed graphics data has been read from memory, then this compressed graphics information is decompressed or expanded in step 135. Control then passes to step 136 where the graphics information is formatted and sent to the printer. If document printing is not complete, control passes back to step 130. This process continues until the page or the document is printed.

An alternate embodiment of the invention is illustrated in FIG. 6a which is similar to that of FIG. 6 but includes a step 133a wherein a process module is employed to merge character and graphics data. The merged data is sent to the printer at step 133b. The merged data may be stored in a memory, such as a printer memory, or routed directly to the printing apparatus in chunks of either 1 page, a fraction of a page, or even in multi-page segments depending on the characteristics of the printer itself and its spooling capabilities. Information might also be routed to a spooler in the memory of a computer, and from there to printing apparatus peripherally attached to the computer.

Figure 7:
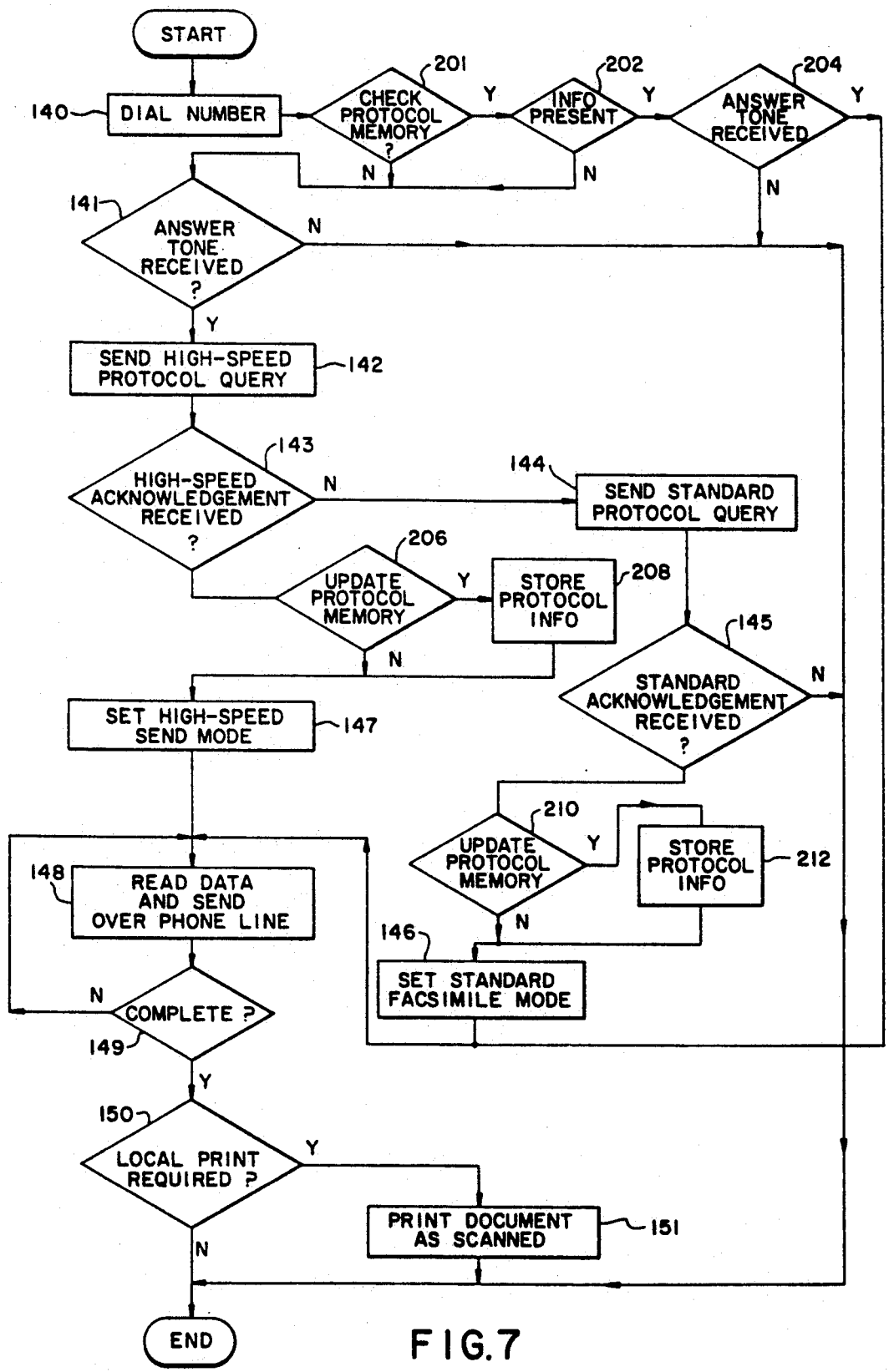
FIG. 7 is a flow chart of the operation of document transmission.

FIGS. 7 and 7a are flow charts of the operation of the telefacsimile machine according to the invention in the transmit mode. As mentioned earlier, one feature of this invention is that it can automatically switch between a high-speed fax mode and a standard telefacsimile transmission mode. The phone number of the receiving fax is dialed in step 140. In step 201 (FIG. 7) or 200 (FIG. 7a), if the system has a protocol memory for storing destination telefax protocols, the protocol memory can be checked. If a protocol memory is checked, and information is present for the destination telefax machine, it is determined if an answer is received from the destination machine (step 204). If the information is not present, the number may be optionally entered in the protocol memory (step 203 in FIG. 7a). If an answer is received in step 204, step 205 in FIG. 7a may be used to determine if the protocol is to be verified for some reason, such as a periodic verification. If there is no protocol verification option (FIG. 7), control may pass directly to step 148 as discussed below. If no protocol memory check takes place (steps 200 and 201) or the protocol for the number dialed is not present (step 202), whether an answer tone was received is determined in step 141. If not, execution of the transmission routine ends.

If an answer tone is received, then in step 142 a query is sent to the receiving telefacsimile to determine whether it can operate in the high-speed protocol mode. If no high-speed acknowledgement is received within a predetermined time, step 143 transfers control to step 144 which sends a standard telefacsimile protocol query. It will be understood that the order of the queries can be reversed. If a standard telefacsimile acknowledgement is not received, then step 145 exits from the transmission routine. If either a standard or high speed acknowledgement is received, steps 210 and 206, respectively can test if the protocol memory should be updated. If so, control passes through memory update step 212 or 208 for the standard and high speed modes, respectively. It will be known by those of ordinary skill that the update protocol inquiries in steps 210 and 206 and store protocol information instructions for steps 208 and 212 may call the same processing routines, respectively.

If a standard telefacsimile acknowledgement is received in step 145, control passes to step 146 where the standard telefacsimile mode of transmission is set in the fax machine and control is passed to step 300 in FIG. 7a or directly to step 148 in FIG. 7. If a high-speed protocol acknowledgement is recognized in step 143, control passes to step 147, where the high-speed protocol mode of transmission is set in the fax machine.

Optionally, the need to make protocol inquiries might be bypassed by instructions based on information recalled from a memory of protocols of various fax numbers. However, it is preferable that even when a protocol memory is present, protocol queries are made with every transmission. If any variance with protocol information stored in memory is discovered, memory can be updated to reflect this new information. A method of verifying protocol and intergrating updates with a system in which documents are scanned and preformatted (such as that shown in FIG. 4a) is shown in FIG. 7a. This is accomplished in steps 300-312. In step 300, in either the high or low speed modes, a preformatted document taken from memory (step 304) is checked. If the document format is compatible, control passes to step 148. If not, new compatible protocol information is stored (step 306). If this other protocol is already stored, it is selected (steps 308 and 312). If not, the reformatting time may optionally be estimated in step 310. If reformatting time is long, or in an embodiment where step 310 is omitted, the process is terminated, while a relatively short reformatting time results in executing the strategy beginning at step 101a, as shown in FIG. 4a.

In step 148 the data to be sent is read from memory or directly from the scanner interface and sent over the phone line using either the high-speed mode or the standard telefacsimile mode, depending on which mode was previously set. The telefacsimile data is sent by step 148 until the transmission is complete. At this point step 149 passes control to step 150 which determines if a local printout of the transmitted document is required. This feature allows an operator at a transmitting fax to obtain a copy of the document that will actually be printed at the receiving end so that it may be checked for any possible errors in scanning and character recognition. If a local printout is required, then step 150 passes control to step 151 where the document is printed as it was scanned and the transmission routine is exited.

The printout of the scanned document may optionally be solicited before actually dialling the remote facsimile machine to enable it to be checked for accuracy before actually sending it. Alternatively, it might be displayed on a CRT monitor or equivalent.

Further, the fax machine according to the invention may optionally be provided with an editing means to override OCR scanning in a defined portion of a document or the document as a whole where parsing errors were either detected by the user or else suspected to be liable to arise based on the character of the original material, i.e., a poor photocopy of the original document. Such an editing feature is illustrated in blocks 104a and 104b connected by dotted lines in the flow chart of FIG. 4. This editing feature is optional, however, since a prime advantage of the invention is in not wasting time and energy on anything that is difficult to be parsed, as such material is sent as standard fax data, instead of devoting a great deal of human or computing resources to trying to decipher it.

Figure 8:
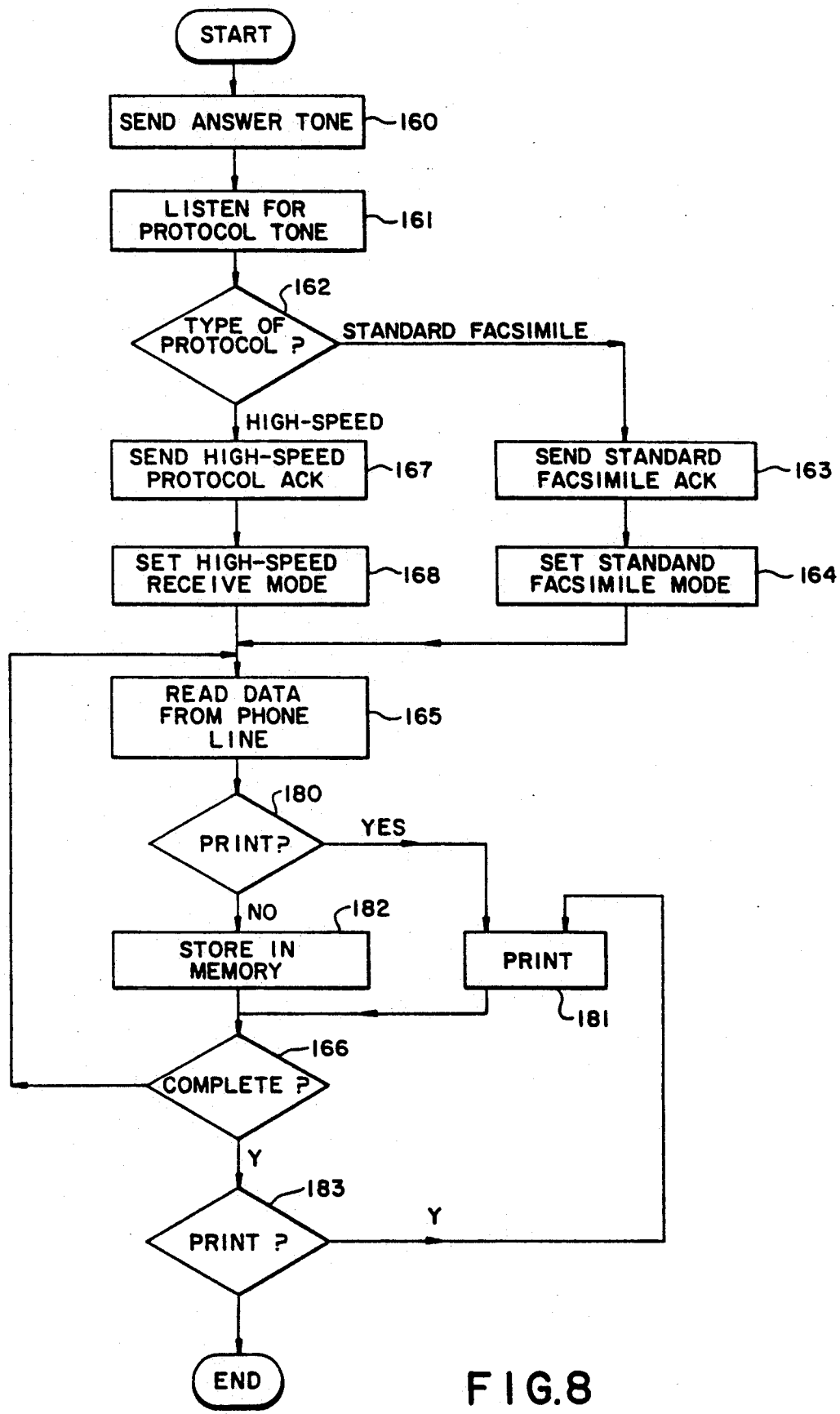
FIG. 8 is a flow chart of the operation of document reception.
Figure 8:
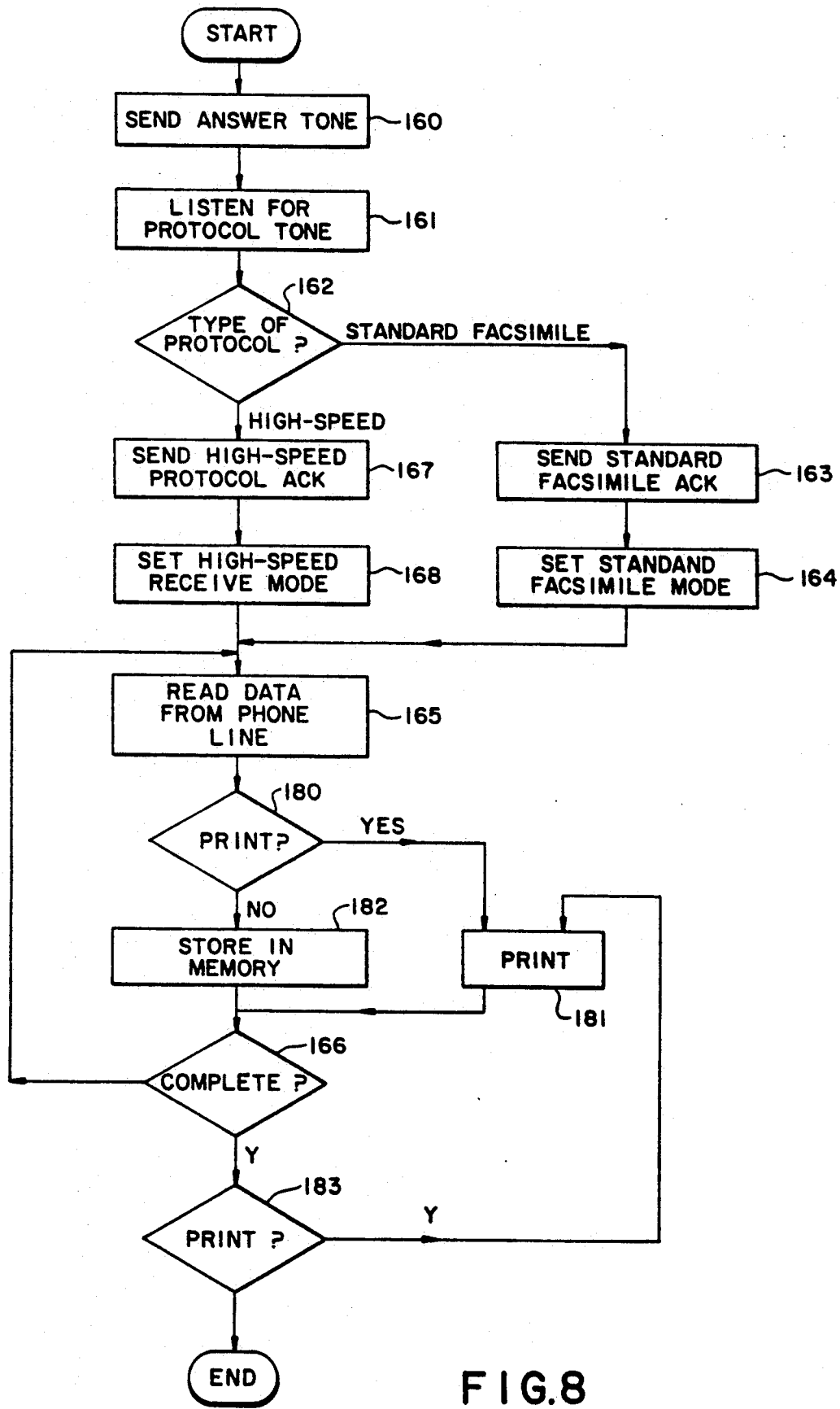

FIG. 8 is a flow chart of the steps required to receive a telefacsimile from the transmitting telefacsimile machine. In step 160, the receiver 96 of the fax answers the phone and sends an answer tone. In step 161, a protocol analyzer 97 of a receive mode detector 96 of the receiving telefacsimile machine listens for a protocol signal sent by the transmitting telefacsimile machine. If the transmitting fax machine indicates that a standard telefacsimile is being sent, then step 162 passes control to step 163 where a standard telefacsimile acknowledgement is sent and then to step 164, where the standard telefacsimile operation mode of the receiving fax machine is set. Control is then passed to step 165. If a high-speed protocol signal is received by the mode detector 96 in step 162, then control is passed to step 167, where a high-speed protocol acknowledgement is sent by the receive mode detector of the receiving telefacsimile machine. At this point the high-speed receive mode is set in step 168. In step 165, data from the transmitting telefacsimile machine is read from the phone line and placed into the memory 14 (step 182), or alternatively, routed directly to the printer (steps 180, 181). Data is read from the phone line and placed in the memory or routed to the printer in step 165 until at step 166 it is decided that reception is complete. Using character decoder 99, the received characters can be decoded and accessed through character library 64 or directly printed. Processing then takes place as previously discussed relative to FIG. 6 or 6a to complete printing of the received document. It should be noted that the invention is not limited to printing the received document but is equally applicable to storing the document on disk or on any other suitable storage means so that the document can be printed either upon completion of reception (step 183) or at another convenient time.

The control and sequencing of the telefacsimile coding transmission and reception system as shown in the flow charts described above is preferably implemented using the microprocessor of control 28 programmed to carry out the flow chart sequencing. Alternately, dedicated hardware or firmware such as ROM chips or the like may be employed.

As the above description illustrates, scanning, coding and decoding can all be performed on line, so that documents need not be stored in a memory buffer, but may be transmitted in real time over the communications media. Alternatively documents which are to be transmitted or which are received can be stored in memory for processing and accessed as required by the system.

While particular embodiments of the present invention have been illustrated and described above, it will be clear that the invention can take a variety of forms and embodiments within the scope of the appended claims.

I claim:

1. A method of telefaxing documents, the method comprising the steps of:
    scanning a document with a document reader providing a digitized representation of the document;
    activating one of a standard speed mode and a high speed mode with a mode selector, the activated mode being compatible with an available mode at a destination telefacsimile;
    in the standard speed mode, formatting the digitized representation of the document into bit-mapped pixels and, in the high speed mode identifying, by character recognition techniques, character and non-character information in the document, and formatting the identified character information in an abbreviated code for each character and the non-character information into bit-mapped pixels; and
    transmitting from a transmitter the abbreviated codes and bit mapped pixels in the high speed mode and the bit mapped pixels in the standard mode.

2. The method recited in claim 1, further comprising interrogating said destination telefacsimile and determining if a high speed mode is available at the destination telefacsimile.

3. The method recited in claim 2, wherein the step of interrogating said destination telefacsimile comprises transmitting from a mode interrogator a mode query signal to the destination telefacsimile and determining in a mode detector a response from the destination telefacsimile.

4. The method recited in claim 3, further comprising storing in a memory the response of the destination facsimile queried after transmission of said mode query signal.

5. The method recited in claim 4, further comprising referencing the stored response to select the mode of formatting of additional documents destined for said destination telefacsimile queried after transmission of said mode query signal.

6. The method recited in claim 4, further comprising referencing the stored response to select the mode of transmission.

7. The method recited in claim 3, wherein the mode detector measures a time from transmission of the mode query signal and, if a predetermined time elapses without detecting a response, directs the telefacsimile to set the standard telefacsimile mode.

8. The method recited in claim 1, wherein a text character separator isolates individual text characters from each other.

9. The method recited in claim 8, wherein a character recognizer determines if isolated text characters correspond to entries in a character library containing the abbreviated codes.

10. The method recited in claim 1, further comprising recording a representation of the document scanned in at least one storage medium.

11. The method recited in claim 1, further comprising distinguishing between text and graphics in the digitized representation of the document.

12. The method recited in claim 1 further comprising the step of receiving at a receiver documents in one of the standard and high speed modes.

13. The method recited in claim 12, further comprising the step of determining in said receiver one of the standard and high speed modes of an incoming document.

14. The method recited in claim 12, further comprising the step of selecting in said receiver one of the high speed mode and the standard mode to correspond with the mode of the incoming document indicated by a protocol signal.

15. The method recited in claim 12, further comprising the step of decoding in a decoder the abbreviated codes received for each character in the high speed mode.

16. A telefacsimile device comprising:
    a scanner, the scanner having a document reader with an output providing a digitized representation of a read document;
    a mode selector for activating one of (1) a standard telefacsimile mode and (2) a high speed mode, the activated mode being compatible with an available mode at a destination telefacsimile device;
    a scanner control and data interface, operative in the standard telefacsimile mode for formatting the digitized representation of the document into bit-mapped pixels, and operative in the high speed mode, to use character recognition techniques to format the digitized representation into identified character information in combination with non-character information, wherein said identified character information is formatted in abbreviation code and said non-character information is formatted into bit mapped pixels.

17. The telefacsimile device recited in claim 16, further comprising a transmitter for transmitting said formatted digitized representation of the document in the selected one of the standard and high speed modes.

18. The telefacsimile device recited in claim 16, further comprising a receiver for receiving documents in a selected one of the standard and high speed modes.

19. The telefacsimile device recited in claim 16, wherein the mode selector further comprises said mode interrogator for determining if a high speed mode is available at said destination telefacsimile device.

20. The telefacsimile device recited in claim 19, wherein the mode interrogator comprises a signal generator for transmitting a mode query signal to said destination telefacsimile device and mode detector for determining a response from the destination telefacsimile device.

21. The telefacsimile device recited in claim 20, further comprising a memory for storing said response.

22. The telefacsimile device recited in claim 20, wherein the mode detector contains a timer for measuring a time from transmission of the mode query signal and for, if after a predetermined time elapses without detecting ak response, directing the telefacsimile to set the standard telefacsimile mode.

23. The telefacsimile device recited in claim 16, wherein the abbreviated code is an ASCII code.

24. The telefacsimile device recited in claim 18, wherein the receiver contains a receive mode detector for determining a mode of an incoming document.

25. The telefacsimile device recited in claim 24, wherein the receive mode detector contains a protocol analyzer for selecting one of the high speed mode and the standard mode to correspond with the mode of the incoming document indicated by a protocol signal.

26. The telefacsimile device recited in claim 18, further comprising a decoder for decoding abbreviated codes received in the high speed mode.

27. The telefacsimile device recited in claim 16, further comprising a text character separator for isolating individual text characters from each other.

28. The telefacsimile device recited in claim 27, further comprising a character library and a character recognizer for determining if isolated text characters correspond to entries in the character library.

29. The telefacsimile device recited in claim 28, wherein the entries in the character library contain the abbreviated codes.

30. The telefacsimile device recited in claim 16, wherein the scanner control and data interface further includes means for distinguishing between text and graphics in the digitized representation of the document.

31. The telefacsimile device recited in claim 16, further comprising at least on storage medium for recording a representation of said scanned document.

* * * * *